United States Patent
Barrick et al.

(10) Patent No.: US 9,971,687 B2
(45) Date of Patent: May 15, 2018

(54) OPERATION OF A MULTI-SLICE PROCESSOR WITH HISTORY BUFFERS STORING TRANSACTION MEMORY STATE INFORMATION

(71) Applicant: International Business Machines Corporation, Armonk, NY (US)

(72) Inventors: Brian D. Barrick, Pflugerville, TX (US); Susan E. Eisen, Round Rock, TX (US); Kurt A. Feiste, Austin, TX (US); Dung Q. Nguyen, Austin, TX (US); Kenneth L. Ward, Austin, TX (US); Jing Zhang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 17 days.

(21) Appl. No.: 15/043,656

(22) Filed: Feb. 15, 2016

(65) Prior Publication Data

US 2017/0235674 A1 Aug. 17, 2017

(51) Int. Cl.
*G06F 12/00* (2006.01)
*G06F 13/00* (2006.01)
(Continued)

(52) U.S. Cl.
CPC .......... *G06F 12/0804* (2013.01); *G06F 9/467* (2013.01); *G06F 12/0891* (2013.01);
(Continued)

(58) Field of Classification Search
CPC . G06F 9/30; G06F 9/3636; G06F 9/38; G06F 9/3834; G06F 9/3842; G06F 9/4418; G06F 9/46; G06F 9/461; G06F 9/462; G06F 9/463; G06F 9/466; G06F 9/467; G06F 9/4843; G06F 9/485; G06F 9/52;
(Continued)

(56) References Cited

U.S. PATENT DOCUMENTS 6,134,632 A * 10/2000 Looi ................... G06F 12/0804
  707/999.101
6,301,630 B1   10/2001 Chen et al.
(Continued)

OTHER PUBLICATIONS

Multi-slicing: a compiler-supported parallel approach to data dependence profiling; Yu et al; Proceedings of the 2012 International Symposium on Software Testing and Analysis; Jul. 15-20, 2012; pp. 23-33 (11 pages) (Year: 2012).*
(Continued)

*Primary Examiner* — Daniel C Chappell
(74) *Attorney, Agent, or Firm* — Brandon C. Kennedy; Robert R. Williams; Kennedy Lenart Spraggins LLP (57) ABSTRACT

A multi-slice processor that includes execution slices, and a history buffer, where the history buffer includes a plurality of entries, where at least one of the entries includes transactional memory state data that corresponds to a transactional memory instruction updating a transaction memory state, and where operation of such a multi-slice processor includes: propagating a flush signal to the plurality of entries of the history buffer; responsive to the flush signal, generating, from an entry of the history buffer, the transactional memory state data; and restoring to a transactional memory state in dependence upon the transactional memory state data.

12 Claims, 6 Drawing Sheets

(51) Int. Cl.
  *G06F 13/28* (2006.01)
  *G06F 12/0804* (2016.01)
  *G06F 9/46* (2006.01)
  *G06F 12/12* (2016.01)
  *G06F 12/0891* (2016.01)
  *G06F 13/42* (2006.01)
  *G06F 13/38* (2006.01)

(52) U.S. Cl.
  CPC ............ *G06F 12/12* (2013.01); *G06F 13/385* (2013.01); *G06F 13/4282* (2013.01); *G06F 2212/60* (2013.01); *G06F 2212/69* (2013.01)

(58) Field of Classification Search
  CPC .......... G06F 9/522; G06F 9/524; G06F 9/526; G06F 9/528; G06F 12/00; G06F 12/08; G06F 12/0802; G06F 12/0804; G06F 12/0806; G06F 12/0815; G06F 12/0891; G06F 12/0893; G06F 12/10; G06F 12/12; G06F 12/121; G06F 12/122; G06F 12/123; G06F 12/124; G06F 12/125; G06F 12/126; G06F 12/127; G06F 12/128; G06F 13/38; G06F 13/382; G06F 13/385; G06F 13/387; G06F 13/42–13/4295; G06F 2212/1016; G06F 2212/1024; G06F 2212/1028; G06F 2212/1032; G06F 2212/1036; G06F 2212/1041; G06F 2212/30; G06F 2212/301; G06F 2212/302; G06F 2212/303; G06F 2212/50; G06F 2212/502; G06F 2212/507; G06F 2212/60; G06F 2212/602; G06F 2212/6024; G06F 2212/6042; G06F 2212/6046; G06F 2212/62; G06F 2212/621; G06F 2212/622; G06F 2212/68; G06F 2212/681; G06F 2212/682; G06F 2212/683; G06F 2212/684; G06F 2212/69
  See application file for complete search history.

(56) References Cited

U.S. PATENT DOCUMENTS

| | | | |
|---|---|---|---|
| 7,085,898 B2* | 8/2006 | Blake ................. | G06F 12/0813 370/460 |
| 7,165,129 B1 | 1/2007 | Okmianski et al. | |
| 7,676,691 B2 | 3/2010 | Fachan et al. | |
| 8,250,308 B2* | 8/2012 | Papazova ............ | G06F 12/0831 711/141 |
| 8,549,354 B2* | 10/2013 | Chen ...................... | G06F 9/528 714/18 |
| 8,612,694 B2 | 12/2013 | Pohlack et al. | |
| 8,626,721 B2* | 1/2014 | Bradshaw ......... | G06F 17/30008 707/674 |
| 8,930,644 B2 | 1/2015 | Kulkarni et al. | |
| 9,465,432 B2* | 10/2016 | Henry ...................... | G06F 1/04 |
| 9,594,697 B2* | 3/2017 | Apodaca ............... | G06F 12/126 |
| 9,740,620 B2* | 8/2017 | Ayub .................. | G06F 12/0875 |
| 9,747,217 B2* | 8/2017 | Ayub .................. | G06F 12/0875 |
| 2010/0169622 A1* | 7/2010 | Nguyen ............... | G06F 9/3863 712/228 |
| 2012/0144164 A1* | 6/2012 | Nguyen ............... | G06F 9/3863 712/206 |
| 2012/0304002 A1* | 11/2012 | Chen ...................... | G06F 9/467 714/15 |
| 2014/0156933 A1* | 6/2014 | Shaikh ............... | G06F 12/0875 711/123 |
| 2014/0281236 A1* | 9/2014 | Rash ...................... | G06F 12/00 711/122 |
| 2015/0199279 A1* | 7/2015 | Haugan ............... | G06F 12/1009 711/133 |
| 2015/0242214 A1 | 8/2015 | Busaba et al. | |

OTHER PUBLICATIONS

Embedded Multicore Implementation of a H.264 Decoder with Power Management Considerations; Bilavarn et al; 11th EUROMICRO Conference on Digital System Design Architectures, Methods and Tools; Sep. 3-5, 2008; pp. 124-130 (7 pages) (Year: 2008).*

AVC-Intra 100 Mbps Compression in a File Based Master Archive; Michael Bergeron; SMPTE Technical Conference & Exhibition; Oct. 28-30, 2008 (21 pages) (Year: 2008).*

IBM, "A Dedicated Buffer Based Transactional Memory Systme with Two-Phase Commit Support", An IP.com Prior Art Database Technical Disclosure (online), IP.com No. IPCOM000180978D, dated Mar. 23, 2009, 3 pages.

Muller et al., "Commit Protocols for a Distributed Transactional Memory", The 11th International Conference on Parallel and Distributed Computing, Applications and Technologies, dated Dec. 2010, 10 pages, IEEE Xplore (online), DOI: 10.1109/PDCAT.2010.74, Dusseldorf, Germany.

* cited by examiner

OPERATION OF A MULTI-SLICE PROCESSOR WITH HISTORY BUFFERS STORING TRANSACTION MEMORY STATE INFORMATION

BACKGROUND

Field of the Invention

The field of the invention is data processing, or, more specifically, methods and apparatus for operation of a multi-slice processor.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer system technology that has advanced is computer processors. As the number of computer systems in data centers and the number of mobile computing devices has increased, the need for more efficient computer processors has also increased. Speed of operation and power consumption are just two areas of computer processor technology that affect efficiency of computer processors.

SUMMARY

Methods and apparatus for operation of a multi-slice processor are disclosed in this specification. Such a multi-slice processor includes a plurality of execution slices and a plurality of load/store slices, where the load/store slices are coupled to the execution slices via a results bus. Such a multi-slice processor may further include a history buffer, where the history buffer includes a plurality of entries, where at least one of the entries may include transaction memory state data that corresponds to a transactional memory instruction updating a transaction memory state. Operation of such a multi-slice processor includes: propagating a flush signal to the plurality of entries of the history buffer; responsive to the flush signal, generating, from an entry of the history buffer, the transactional memory state data; and restoring to a transactional memory state in dependence upon the transactional memory state data.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
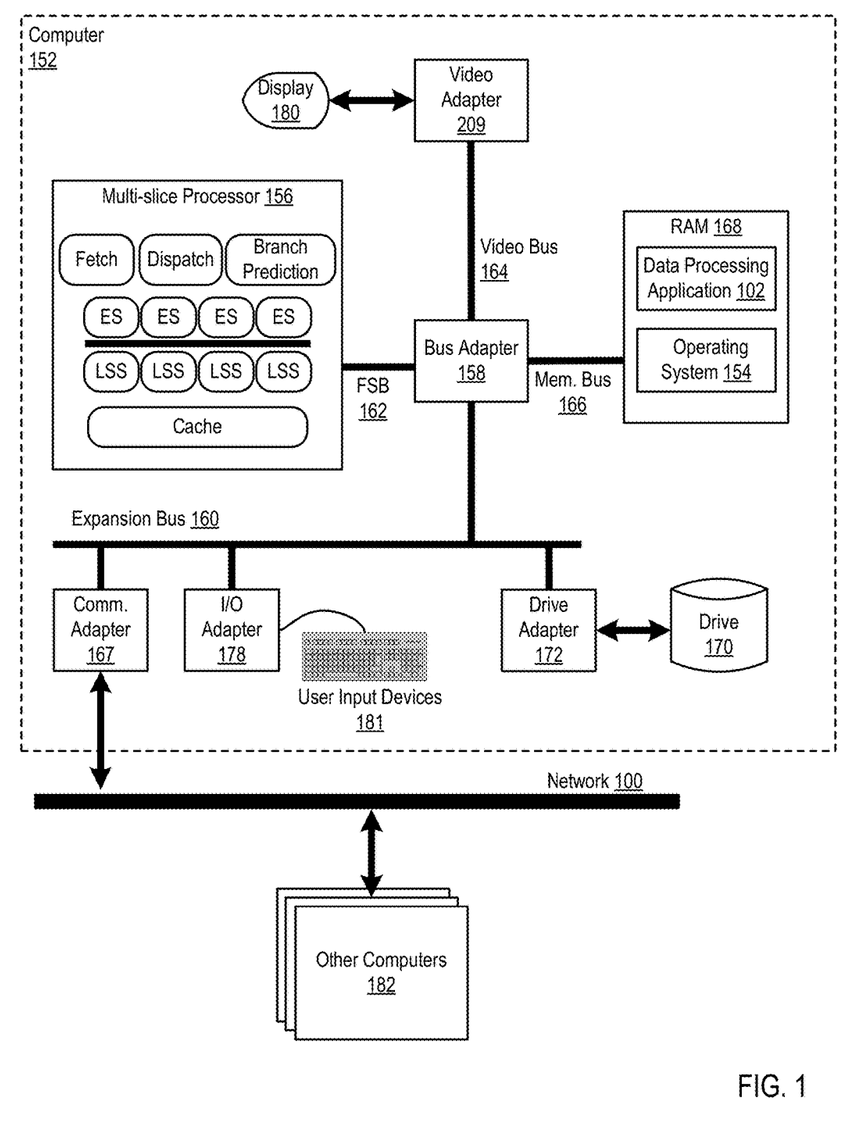
FIG. 1 sets forth a block diagram of an example system configured for operation of a multi-slice processor according to embodiments of the present invention.

Exemplary methods and apparatus for operation of a multi-slice processor in accordance with the present invention are described with reference to the accompanying drawings, beginning with FIG. 1. FIG. 1 sets forth a block diagram of an example system configured for operation of a multi-slice processor according to embodiments of the present invention. The system of FIG. 1 includes an example of automated computing machinery in the form of a computer (152).

The computer (152) of FIG. 1 includes at least one computer processor (156) or 'CPU' as well as random access memory (168) (RAM') which is connected through a high speed memory bus (166) and bus adapter (158) to processor (156) and to other components of the computer (152).

The example computer processor (156) of FIG. 1 may be implemented as a multi-slice processor. The term 'multi-slice' as used in this specification refers to a processor having a plurality of similar or identical sets of components, where each set may operate independently of all the other sets or in concert with the one or more of the other sets. The multi-slice processor (156) of FIG. 1, for example, includes several execution slices ('ES') and several load/store slices ('LSS'). Each execution slice may be configured to provide components that support execution of instructions: an issue queue, general purpose registers, a history buffer, an arithmetic logic unit (including a vector scalar unit, a floating point unit, and others), and the like. Each of the load/store slices may be configured with components that support data movement operations such as loading of data from cache or memory or storing data in cache or memory. In some embodiments, each of the load/store slices includes a data cache. The load/store slices are coupled to the execution slices through a results bus. In some embodiments, each execution slice may be associated with a single load/store slice to form a single processor slice. In some embodiments, multiple processor slices may be configured to operate together.

The example multi-slice processor (156) of FIG. 1 may also include, in addition to the execution and load/store slices, other processor components. In the system of FIG. 1, the multi-slice processor (156) includes fetch logic, dispatch logic, and branch prediction logic. Further, although in some embodiments each load/store slice includes cache memory, the multi-slice processor (156) may also include cache accessible by any or all of the processor slices.

Although the multi-slice processor (156) in the example of FIG. 1 is shown to be coupled to RAM (168) through a front side bus (162), a bus adapter (158) and a high speed memory bus (166), readers of skill in the art will recognize that such configuration is only an example implementation. In fact, the multi-slice processor (156) may be coupled to other components of a computer system in a variety of configurations. For example, the multi-slice processor (156) in some embodiments may include a memory controller configured for direct coupling to a memory bus (166). In some embodiments, the multi-slice processor (156) may support direct peripheral connections, such as PCIe connections and the like.

Stored in RAM (168) in the example computer (152) is a data processing application (102), a module of computer program instructions that when executed by the multi-slice processor (156) may provide any number of data processing tasks. Examples of such data processing applications may include a word processing application, a spreadsheet application, a database management application, a media library application, a web server application, and so on as will occur to readers of skill in the art. Also stored in RAM (168) is an operating system (154). Operating systems useful in computers configured for operation of a multi-slice processor according to embodiments of the present invention include UNIX™, Linux™, Microsoft Windows™, AIX™, IBM's z/OS™, and others as will occur to those of skill in the art. The operating system (154) and data processing application (102) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers configured for operation of a multi-slice processor according to embodiments of the present invention include Integrated Drive Electronics ('IDE') adapters, Small Computer System Interface (SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for operation of a multi-slice processor according to embodiments of the present invention include modems for wired dial-up communications, Ethernet (IEEE 802.3) adapters for wired data communications, and 802.11 adapters for wireless data communications.

The arrangement of computers and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
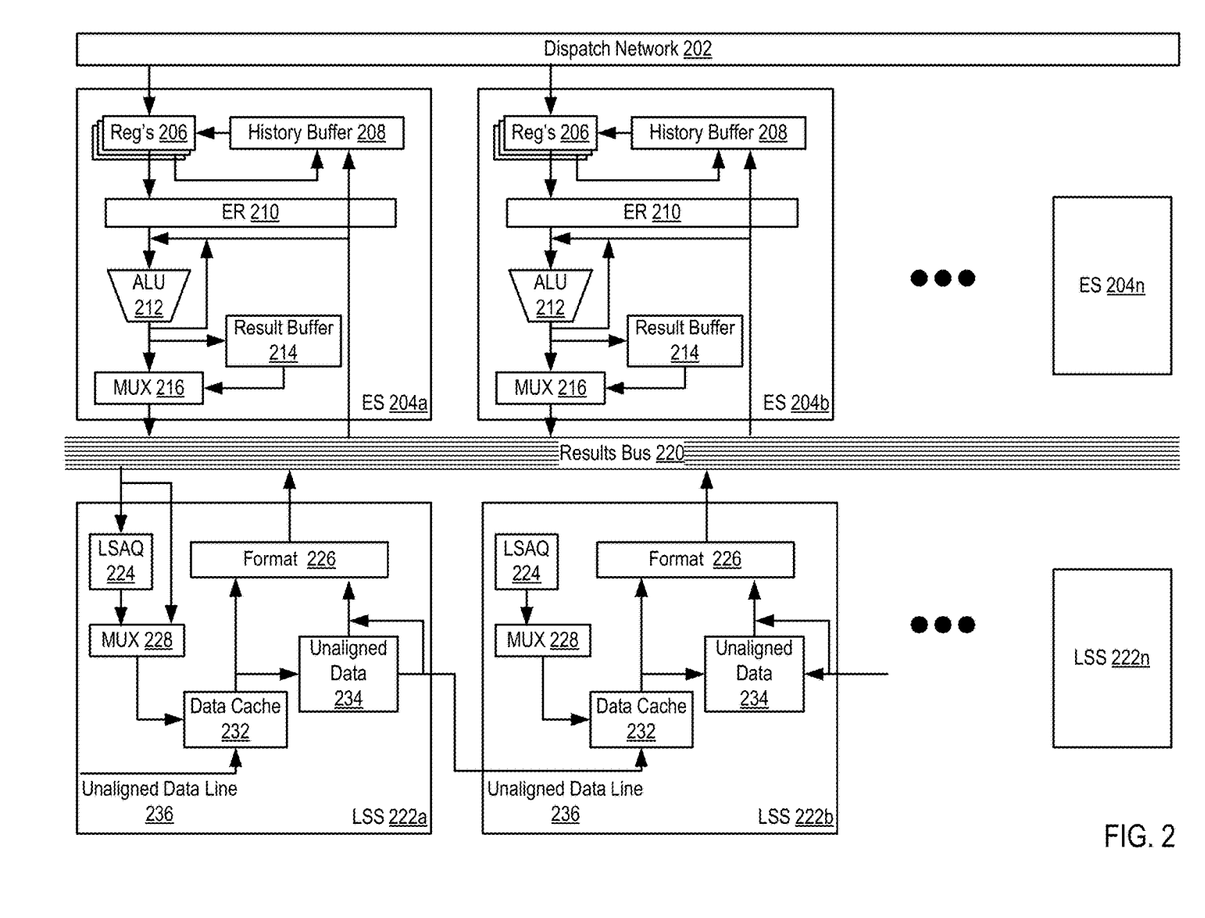
FIG. 2 sets forth a block diagram of a portion of a multi-slice processor according to embodiments of the present invention.

For further explanation, FIG. 2 sets forth a block diagram of a portion of a multi-slice processor according to embodiments of the present invention. The multi-slice processor in the example of FIG. 2 includes a dispatch network (202). The dispatch network (202) includes logic configured to dispatch instructions for execution among execution slices.

The multi-slice processor in the example of FIG. 2 also includes a number of execution slices (204a, 204b-204n). Each execution slice includes general purpose registers (206) and a history buffer (208). The general purpose registers and history buffer may sometimes be referred to as the mapping facility, as the registers are utilized for register renaming and support logical registers.

The general purpose registers (206) are configured to store the youngest instruction targeting a particular logical register and the result of the execution of the instruction. A logical register is an abstraction of a physical register that enables out-of-order execution of instructions that target the same physical register.

When a younger instruction targeting the same particular logical register is received, the entry in the general purpose register is moved to the history buffer, and the entry in the general purpose register is replaced by the younger instruction. The history buffer (208) may be configured to store many instructions targeting the same logical register. That is, the general purpose register is generally configured to store a single, youngest instruction for each logical register while the history buffer may store many, non-youngest instructions for each logical register.

Each execution slice (204) of the multi-slice processor of FIG. 2 also includes an execution reservation station (210). The execution reservation station (210) may be configured to issue instructions for execution. The execution reservation station (210) may include an issue queue. The issue queue may include an entry for each operand of an instruction. The execution reservation station may issue the operands for execution by an arithmetic logic unit or to a load slice (222a, 222b, 222c) via the results bus (220).

The arithmetic logic unit (212) depicted in the example of FIG. 2 may be composed of many components, such as add logic, multiply logic, floating point units, vector/scalar units, and so on. Once an arithmetic logic unit executes an operand, the result of the execution may be stored in the result buffer (214) or provided on the results bus (220) through a multiplexer (216).

The results bus (220) may be configured in a variety of manners and be of composed in a variety of sizes. In some instances, each execution slice may be configured to provide results on a single bus line of the results bus (220). In a similar manner, each load/store slice may be configured to provide results on a single bus line of the results bus (220). In such a configuration, a multi-slice processor with four processor slices may have a results bus with eight bus lines—four bus lines assigned to each of the four load/store slices and four bus lines assigned to each of the four execution slices. Each of the execution slices may be configured to snoop results on any of the bus lines of the results bus. In some embodiments, any instruction may be dispatched to a particular execution unit and then by issued to any other slice for performance. As such, any of the execution slices may be coupled to all of the bus lines to receive results from any other slice. Further, each load/store slice may be coupled to each bus line in order to receive an issue load/store instruction from any of the execution slices. Readers of skill in the art will recognize that many different configurations of the results bus may be implemented.

The multi-slice processor in the example of FIG. 2 also includes a number of load/store slices (222a, 222b-222n). Each load/store slice includes a queue (224), a multiplexer (228), a data cache (232), unaligned data logic (234) and formatting logic (226). The queue receives load and store operations to be carried out by the load/store slice (222).

The unaligned data logic (234) of each slice is coupled to the unaligned data logic of another slice through the unaligned data line (236). The unaligned data logic (234) enables data to be stored and retrieved across multiple load/store slices. The formatting logic (226) formats data into a form that may be returned on the results bus (220) to an execution slice as a result of a load instruction.

The example multi-slice processor of FIG. 2 may be configured for flush and recovery operations. A flush and recovery operation is an operation in which the registers (general purpose register and history buffer) of the multi-slice processor are effectively 'rolled back' to a previous state. The term 'restore' and 'recover' may be used, as context requires in this specification, as synonyms. Flush and recovery operations may be carried out for many reasons, including missed branch predictions, exceptions, and the like. Consider, as an example of a typical flush and recovery operation, that a dispatcher of the multi-slice processor dispatches over time and in the following order: an instruction A targeting logical register 5, an instruction B targeting logical register 5, and an instruction C targeting logical register 5. At the time instruction A is dispatched, the instruction parameters are stored in the general purpose register entry for logical register 5. Then, when instruction B is dispatched, instruction A is evicted to the history buffer (all instruction parameters are copied to the history buffer, including the logical register and the identification of instruction B as the evictor of instruction A), and the parameters of instruction B are stored in the general purpose register entry for logical register 5. When instruction C is dispatched, instruction B is evicted to the history buffer and the parameters of instruction C are stored in the general purpose register entry for logical register 5. Consider, now, that a flush and recovery operation of the registers is issued in which the dispatch issues a flush identifier matching the identifier of instruction C. In such an example, flush and recovery includes discarding the parameters of instruction C in the general purpose register entry for logical register 5 and moving the parameters of instruction B from the history buffer for instruction B back into the entry of general purpose register for logical register 5.

During the flush and recovery operation, in prior art processors, the dispatcher was configured to halt dispatch of new instructions to an execution slice. Such instructions may be considered either target or source instructions. A target instruction is an instruction that targets a logical register for storage of result data. A source instruction by contrast has, as its source, a logical register. A target instruction, when executed, will result in data stored in an entry of a register file while a source instruction utilizes such data as a source for executing the instruction. A source instruction, while utilizing one logical register as its source, may also target another logical register for storage of the results of instruction. That is, with respect to one logical register, an instruction may be considered a source instruction and with respect to another logical register, the same instruction may be considered a target instruction.

Figure 3:
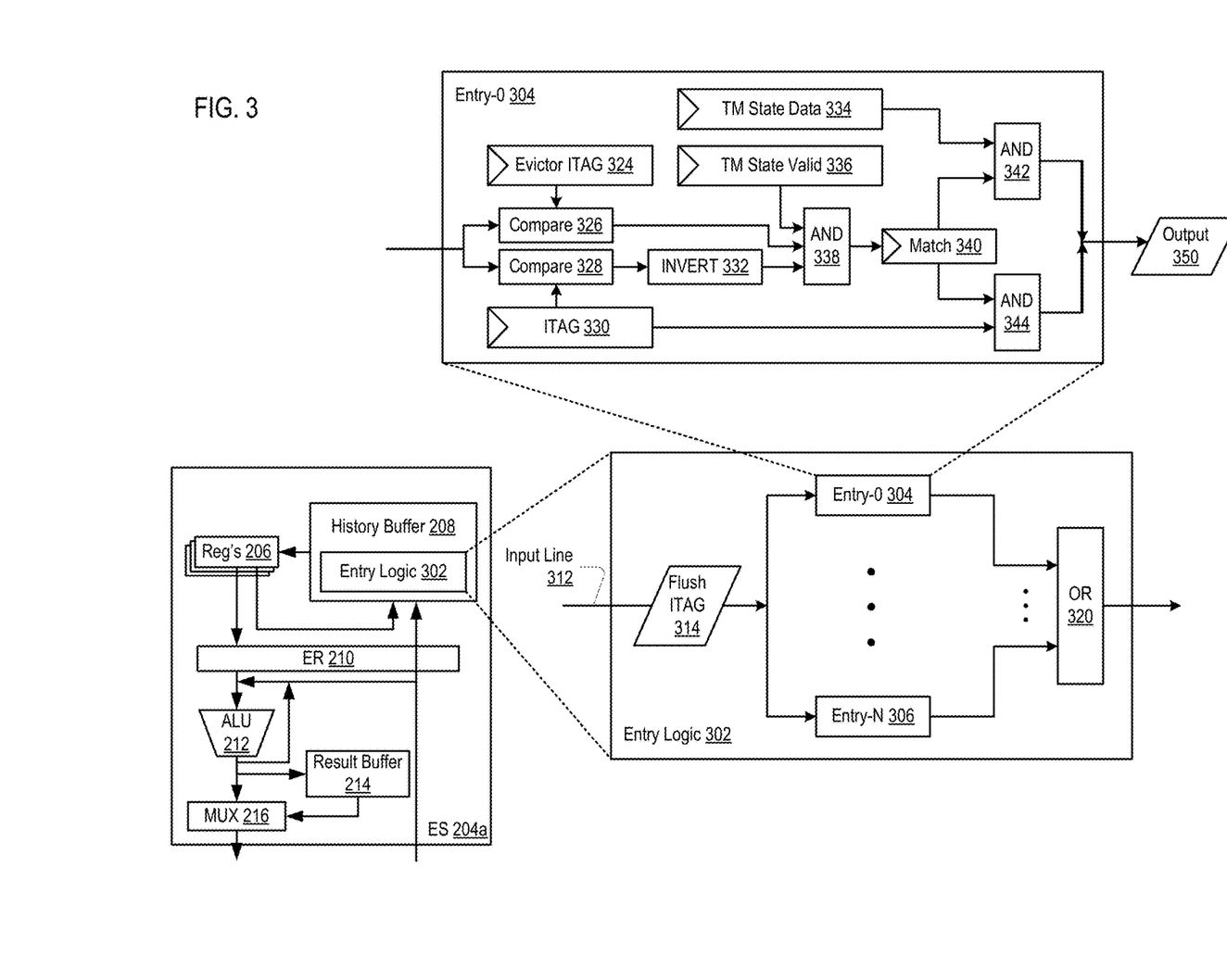
FIG. 3 sets forth a block diagram of a portion of a history buffer of a multi-slice processor, where the history buffer is configured to store transactional memory state data according to different embodiments.

For further explanation, FIG. 3 sets forth a block diagram of a portion of a history buffer (208) of a multi-slice processor in which transactional memory state data stored in the history buffer (208) may be generated from the plurality of entries of the history buffer for restoring a transactional memory state. The history buffer (208) may include a plurality of entries of entry logic (302), where each of the entries, entry-0 (304)-entry-N (306), may store information related to an implementation of transactional memory support. Dispatch network (202) may provide indications that instructions were dispatched, indications that an instruction is updating the state of a transaction, indications of state information of a transaction prior to an instruction updating the transaction state, and ITAGs for instructions such as a current instruction or a last instruction to update the state of the transaction.

Transactional memory enables multiple computer instructions to be considered to have executed atomically. In other words, computer instructions that are identified as being transactional memory instructions may be considered by a user to execute within a single clock cycle—regardless of the actual number of clock cycles used in executing the transactional memory instructions.

Entries of the history buffer (208) may store information that has been moved from the general purpose registers (206). The history buffer (208) may also store a history of writes or updates of mapped resources such as data registers and control registers related to a state of a transaction, where a state of a transaction may include information relating to a nesting level, a transaction state, favored status, among others. A control register may include a specified number of control fields that include an ITAG for a previous instruction to write, an FXCC value, among others.

Further, each entry may also be configured to store information related to transactional memory operations. In this way, circuit space may be saved by using some of the existing logic used in an implementation of an entry of the history buffer (208).

As depicted in FIG. 3, entry logic (302) may have any number of entries, and in this implementation, entry logic (302) includes entry-0 (304)-entry-N (306), where N may be an arbitrary number.

In the event of a flush of an instruction which updated the state of a transaction, as further depicted in FIG. 3, entry logic (302) may include an input (312) that is provided to each of the entries, where the input line (312) may transmit a flush instruction identifier or instruction tag (ITAG), depicted as a flush ITAG (314) value.

Responsive to the flush ITAG (314) value, each of the plurality of entries may generate an output value in dependence upon the flush ITAG (314) value, a stored evictor ITAG value, a stored ITAG value corresponding to an ITAG for the last instruction to write to a corresponding facility or register, and stored transactional memory state values within respective logic of the plurality of entries. The outputs of the plurality of entries may be either zero, or stored entry data. The outputs are provided to the logical OR gate (320), to generate a single output in response to the flush ITAG (314) value input.

In the example of FIG. 3, each entry includes various components that are configured to produce the output value of the entry, output (350). For purposes of explanation of such components, one entry, entry-0 (304), in the example of FIG. 3 has been called out. The example entry-0 (304) of FIG. 3 includes a number of magnitude comparison logic (326, 328), an inverter (332), several modules of AND logic (338, 342, 344), and latches (324, 330, 334, 336, 340).

Each of the modules of magnitude comparison logic (326, 328) receive as an input the flush ITAG (314). Similarly, each of the entry-0 (304) modules may receive as input: the evictor ITAG (324), which is latched in evictor ITAG (324); transactional memory state valid data, which is latched in TM State Valid (336); transactional memory state data, which is latched in TM State Data (334); and an ITAG, which is latched in ITAG (330), where the ITAG is an ITAG for the last instruction to update the state of the transaction.

Transactional memory state information, depicted by TM State Valid (336), as the term is used in this specification refers to a transactional memory state bit that is provided by the dispatch logic to indicate a valid transactional memory state. The ITAG (330) may be an instruction tag for a given computer instruction that is the last computer instruction within a transaction memory region of code. In some cases, the last computer instruction in the transaction memory region of code may be the last updater of a transaction memory state. Transactional memory state data (334), as the term is used in this specification, refers to a subset of bits of entry data provided by the dispatch logic.

Given these inputs from the dispatch logic, the entry-0 (304) may determine if a transactional memory state is to be restored dependent upon the AND gate (338) generating a logic high, or true, value that is stored in latch match (340)—where match (340) would hold the indication that a transactional memory state restore is being performed.

Determining that a transactional memory state restore is being performed is dependent upon the transactional memory state valid data (336) indicating valid, upon a magnitude comparison of the evictor ITAG (324) to the flush ITAG (314), and upon a magnitude comparison of the ITAG (330) to the flush ITAG (314)—which would result in all inputs to AND gate (338) being true, and a true value being latched in match (340). Magnitude compare (326) determines whether the flush is older than the evictor ITAG (324), and magnitude compare (328) determines whether the flush is older than ITAG (330), which is the ITAG for the last instruction to update the state of the transaction In this example, the result of a magnitude comparison between the flush ITAG (314) and the ITAG (330) is inverted by inverter gate (332) to indicate that a restore of a transactional memory state is to be performed if the ITAG instruction is older than the flush.

Further, if the value latched in match (340) is true, indicating a transactional memory state restore occurring, then the output of AND gate (342) is the data latched in TM State Data (334) and the output of AND gate (344) is data latched in ITAG (330)—where the output (350) is the combined output of AND gates (342) and (344). For example, output (350) may include a set of bits corresponding to TM State Data (334) from the AND gate (342), and a set of bits corresponding to ITAG (330) data from the AND gate (344).

In this way, the entry (322) in dependence upon the evictor ITAG (324), upon the ITAG (330), and the flush ITAG (314), produces a nonzero output value that includes transactional memory state information for use in restoring a transactional memory state.

Figure 4:
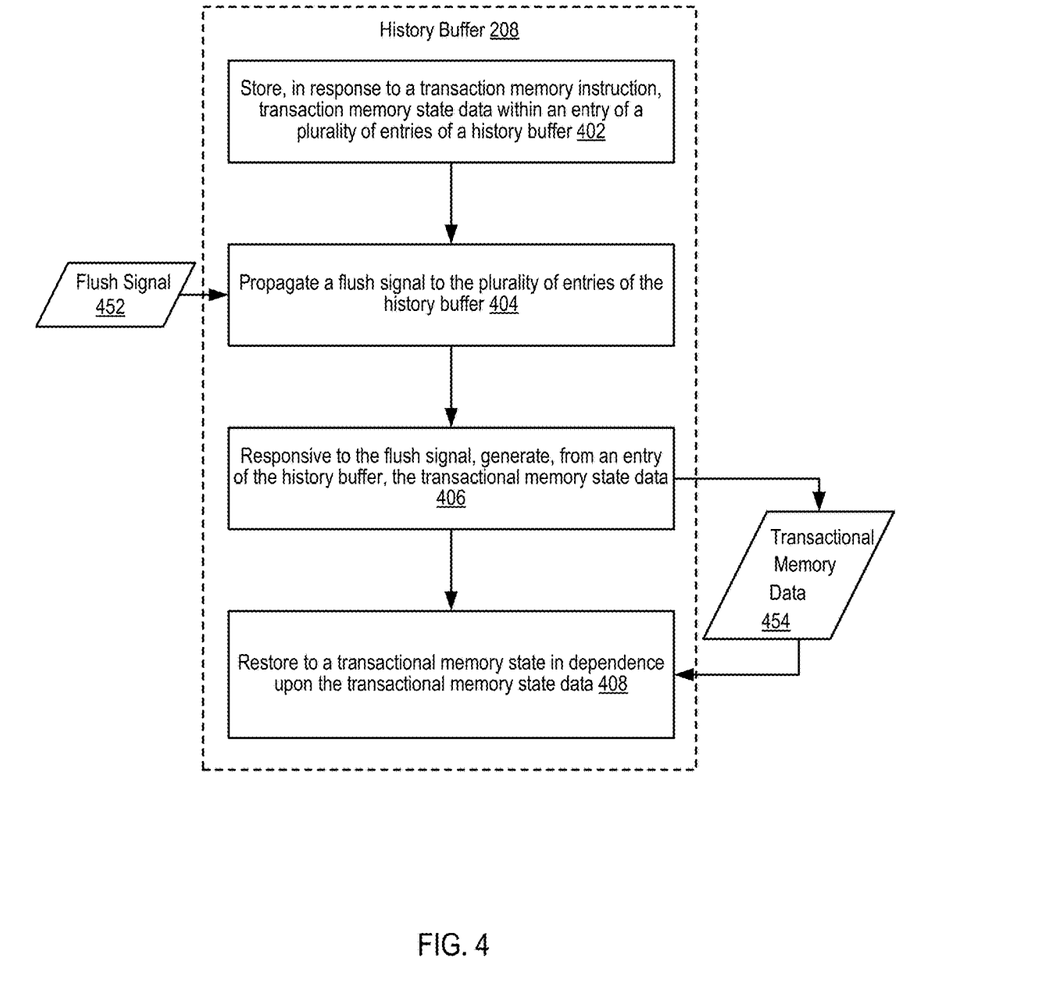
FIG. 4 sets forth a flow chart illustrating an exemplary method of operation of a multi-slice processor in which transactional memory state data stored in a history buffer may be generated from the plurality of entries of the history buffer for restoring a transactional memory state.

For further explanation, FIG. 4 sets forth a flow chart illustrating an exemplary method of operation of a multi-slice processor in which transactional memory state data stored in a history buffer may be generated from the plurality of entries of the history buffer for restoring a transactional memory state. The method of FIG. 4 may be carried out by a multi-slice processor similar to that in the examples of FIGS. 2 and 3. Such a multi-slice processor may include a plurality of execution slices and a plurality of respective history buffers, where each of the history buffers may include a plurality of entries, as described above with regard to FIG. 3.

The method of FIG. 4 includes storing (402), in response to a transactional memory instruction which updates the state of a transaction, transactional memory state data may be stored within an entry of the plurality of entries of the history buffer (208). Storing (402) transactional memory state data may be carried out by the history buffer storing data related to a transaction memory state, including an evictor ITAG that is an ITAG of an instruction updating the transaction memory state, such as evictor ITAG (324), an ITAG that is an ITAG of a last instruction to update the state of the transaction, such as ITAG (330), TM state data (334) that includes state information prior to an instruction corresponding to the ITAG (330) instruction, and TM state valid (336) within a given entry of the plurality of entries of the history buffer (208). Further, storing (402) the transactional memory state data may be carried out in response to receiving a transactional memory instruction, such as computer instruction, or label or token, indicating the beginning of a transactional memory region of code that includes one or more computer instructions. Similarly, a transactional memory region of code may be identified through a computer instruction, or a label or token, indicating a transaction memory end.

The method of FIG. 4 also includes propagating (404) a flush signal (452) to the plurality of entries of the history buffer (208). Propagating (404) a flush signal to the plurality of entries of the history buffer (208) may be carried out by the history buffer providing a flush ITAG input (314) signal to each of inputs of the plurality of entries, as depicted in FIG. 3, where the flush ITAG corresponds to a flush instruction.

Responsive to the flush signal, the method of FIG. 4 continues by generating (406), from an entry of the plurality of entries of the history buffer (208), transactional memory state data (454). Generating (406) the transactional memory state data may be carried out by one of the plurality of entries of the history buffer generating transactional memory state data in dependence upon the flush ITAG, upon a stored evictor ITAG, and upon a stored ITAG, as described above with regard to FIG. 3. In other words, the same flush ITAG may be provided to each of the plurality of entries, entry-0 (304)-entry-N (306), and depending on the evictor ITAG (324) value, and on the ITAG (330) values in the logic of a given entry, one of the entries generates valid transactional memory state data as an output—where the other outputs generate zero, and all the outputs are OR'd through OR gate (320), and where the output of OR gate (320) produces the transactional memory state data output.

The method of FIG. 4 also includes restoring (408) to a transactional memory state in dependence upon the transactional memory state data. Restoring (408) to a transactional memory state may be carried out by providing the transaction memory state data to the dispatcher to be restored back after a flush.

Figure 5:
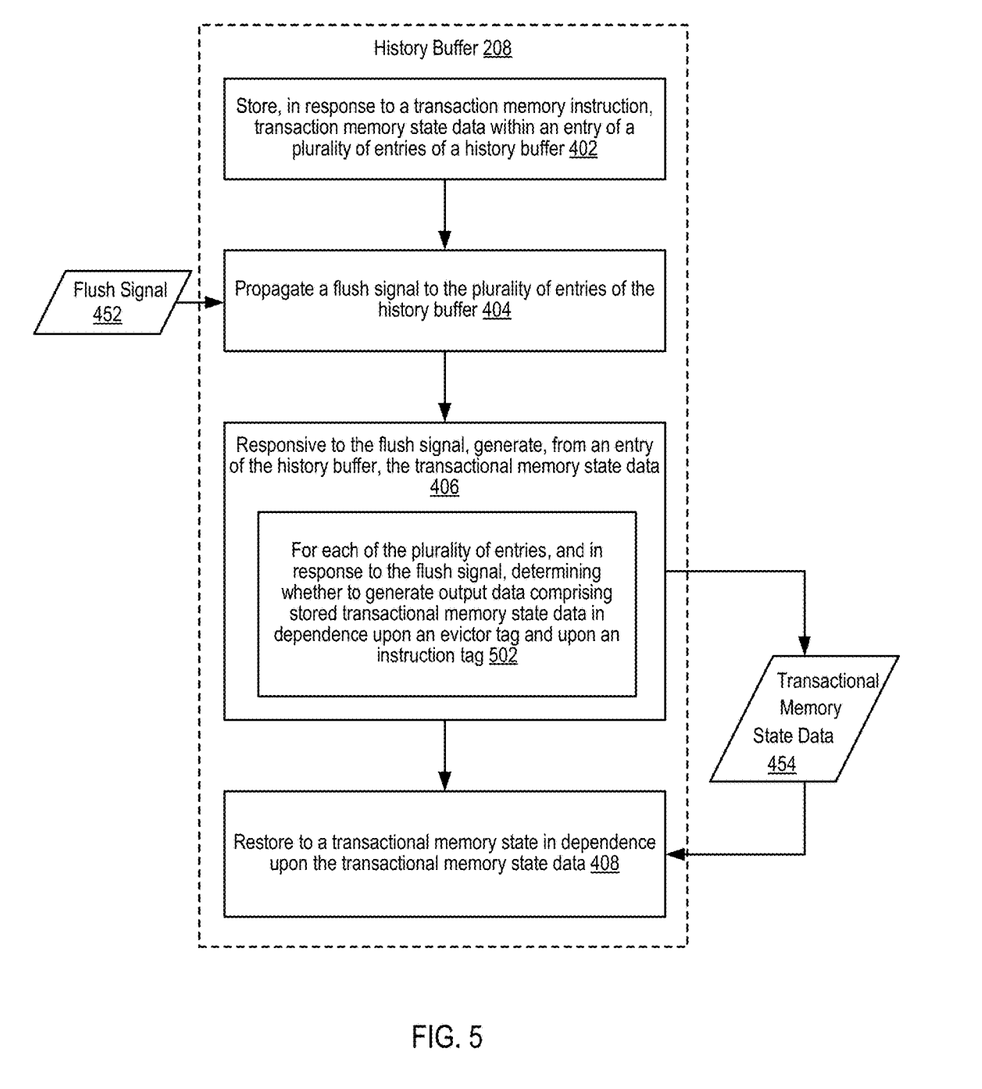
FIG. 5 sets forth a flow chart illustrating an exemplary method of operation of a multi-slice processor in which transactional memory state data stored in a history buffer may be generated from the plurality of entries of the history buffer for restoring a transactional memory state.

For further explanation, FIG. 5 sets forth a flow chart illustrating an exemplary method of operation of a multi-slice processor in which transactional memory state data stored in a history buffer may be generated from the plurality of entries of the history buffer for restoring a transactional memory state. The method of FIG. 5 may be carried out by a multi-slice processor similar to that in the examples of FIGS. 3 and 4. Such a multi-slice processor may include a plurality of execution slices and a plurality of respective history buffers, where each of the history buffers may include a respective plurality of entries, as described above with regard to FIG. 3.

The method of FIG. 5 is similar to the method of FIG. 4 in that the method of FIG. 5 also includes storing (402), in response to a transactional memory instruction, transactional memory state data within an entry of the plurality of entries of the history buffer (208); propagating (404) a flush signal (452) to the plurality of entries of the history buffer (208); responsive to the flush signal, generating (406), from an entry of the plurality of entries of the history buffer (208), transactional memory state data (454); and restoring (408) to a transactional memory state in dependence upon the transactional memory state data.

The method of FIG. 5 differs from the method of FIG. 4, however, in that, in the method of FIG. 5 generating (406), from each of the plurality of entries, the transaction memory state data includes, for each of the plurality of entries of the history buffer, and in response to the flush signal: determining (502) whether to generate output data comprising stored transactional data in dependence upon an evictor tag and upon an instruction tag provided by a dispatch network (202). Determining (502) whether to generate output data may be carried out by the logic of each respective entry that, as depicted in FIG. 3, processes a flush ITAG (314) that is provided to each of the plurality of entries, entry-0 (304)-entry-N (306). An example of the logic of each entry processing the provided flush ITAG (314) is provided above with regard to FIG. 3.

Figure 6:
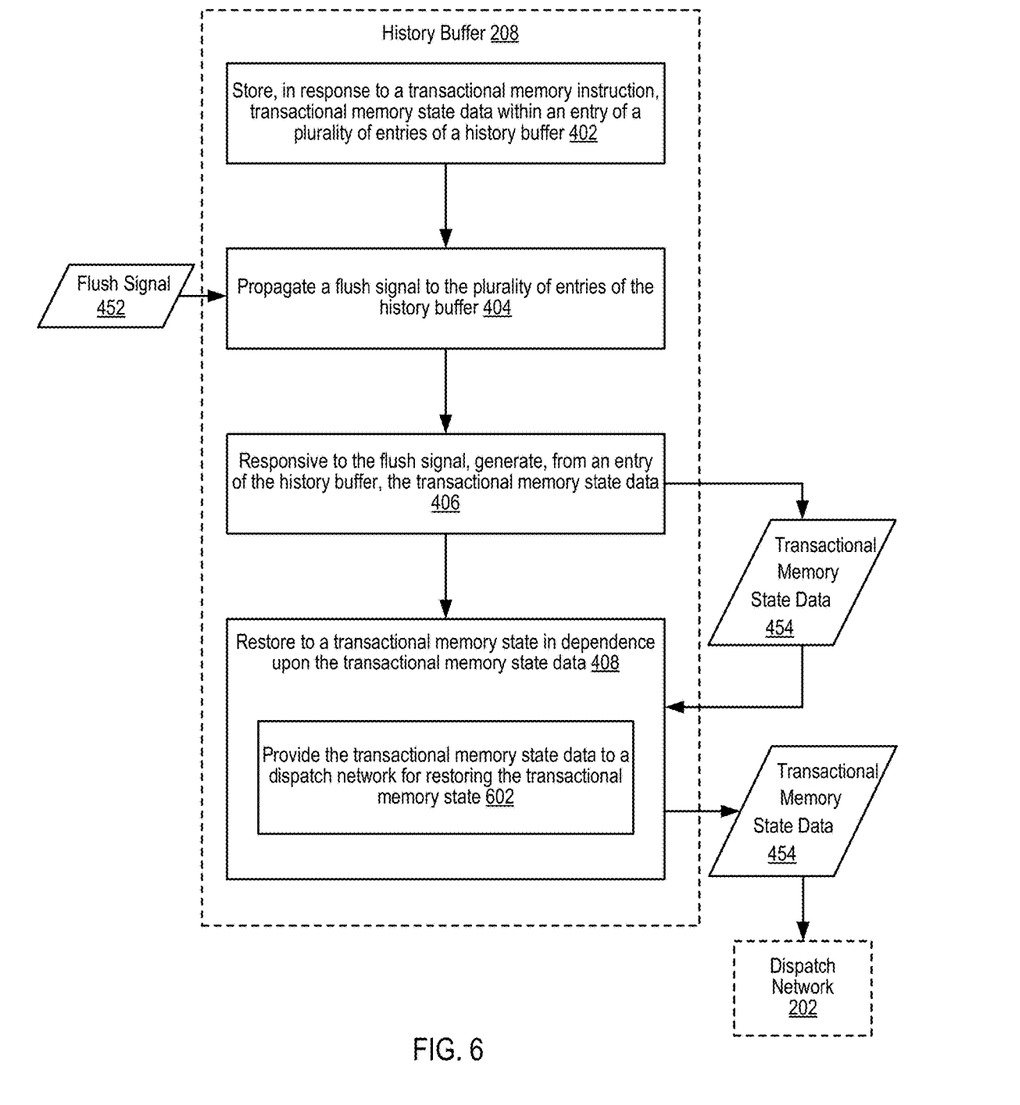
FIG. 6 sets forth a flow chart illustrating an exemplary method of operation of a multi-slice processor in which transactional memory state data stored in a history buffer may be generated from the plurality of entries of the history buffer for restoring a transactional memory state.

For further explanation, FIG. 6 sets forth a flow chart illustrating an exemplary method of operation of a multi-slice processor in which transactional memory state data stored in a history buffer may be generated from the plurality of entries of the history buffer for restoring a transactional memory state. The method of FIG. 6 may be carried out by a multi-slice processor similar to that in the examples of FIGS. 3 and 4. Such a multi-slice processor may include a plurality of execution slices and a plurality of respective history buffers, where each of the history buffers may include a respective plurality of entries, as described above with regard to FIG. 3.

The method of FIG. 6 is similar to the method of FIG. 4 in that the method of FIG. 6 also includes storing (402), in response to a transactional memory instruction, transactional memory state data within an entry of the plurality of entries of the history buffer (208); propagating (404) a flush signal (452) to the plurality of entries of the history buffer (208); responsive to the flush signal, generating (406), from an entry of the plurality of entries of the history buffer (208), transactional memory state data (454); and restoring (408) to a transactional memory state in dependence upon the transactional memory state data (454).

The method of FIG. 6, however, differs from the method of FIG. 4 in that, in the method of FIG. 6, restoring (408) to a transactional memory state in dependence upon the transactional memory state data includes providing (602) the transactional memory state data (454) to the dispatch network (202) for restoring the transactional memory state. Providing (602) the transactional memory state data to the dispatch network (202) may be carried out by the history buffer providing the transactional memory state data to the results bus (220), where the results bus (220) may be coupled to the dispatch network (220) such that the transactional memory state data (454) may be read by the dispatch network (220) from the results bus (220).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operation of a multi-slice processor, the multi-slice processor including a plurality of execution slices, wherein each execution slice comprises a history buffer, wherein the history buffer includes a plurality of entries and at least one of the entries includes transactional memory state data corresponding to a transactional memory instruction updating a transaction memory state, the method comprising:
propagating a flush signal to each of the plurality of entries of the history buffer, wherein the flush signal comprises a flush instruction tag and each entry of the history buffer comprises logic configured to compare a flush instruction tag to one or more other instruction tags stored in the entry, wherein the flush instruction tag comprises an identifier of an instruction to flush;
responsive to the flush signal, generating, from an entry of the history buffer, the transactional memory state data, including:
for each of the plurality of entries, and in response to the flush signal, determining whether to generate the transactional memory state data in dependence upon an evictor tag and upon an instruction tag, wherein the evictor tag corresponds to an instruction tag of an instruction causing an update to the transaction memory state; and
restoring to a transactional memory state in dependence upon the transactional memory state data.

2. The method of claim 1, wherein the transactional memory instruction is an instruction for updating the transactional memory state data.

3. The method of claim 1, wherein the instruction tag corresponds to an instruction that most recently updated the transaction memory state.

4. The method of claim 1, further comprising:
providing the transactional memory state data to a dispatch network for restoring the transactional memory state.

5. A multi-slice processor comprising:
a plurality of execution slices, wherein each execution slice comprises a history buffer, wherein the history buffer includes a plurality of entries and at least one of the entries includes transactional memory state data corresponding to a transactional memory instruction updating a transaction memory state, wherein the multi-slice processor is configured to carry out the steps of:
propagating a flush signal to each of the plurality of entries of the history buffer, wherein the flush signal comprises a flush instruction tag and each entry of the history buffer comprises logic configured to compare a flush instruction tag to one or more other instruction tags stored in the entry, wherein the flush instruction tag comprises an identifier of an instruction to flush;
responsive to the flush signal, generating, from an entry of the history buffer, the transactional memory state data, including:
for each of the plurality of entries, and in response to the flush signal, determining whether to generate the transactional memory state data in dependence upon an evictor tag and upon an instruction tag, wherein the evictor tag corresponds to an instruction tag of an instruction causing an update to the transaction memory state; and
restoring to a transactional memory state in dependence upon the transactional memory state data.

6. The multi-slice processor of claim 5, wherein the transactional memory instruction is an instruction for updating the transactional memory state data.

7. The multi-slice processor of claim 5, wherein the instruction tag corresponds to an instruction that most recently updated the transaction memory state.

8. The multi-slice processor of claim 5 wherein the multi-slice processor is further configured to carry out the steps of:
providing the transactional memory state data to a dispatch network for restoring the transactional memory state.

9. An apparatus comprising:
a plurality of execution slices, wherein each execution slice comprises a history buffer, wherein the history buffer includes a plurality of entries and at least one of the entries includes transactional memory state data corresponding to a transactional memory instruction updating a transaction memory state, wherein the apparatus is configured to carry out the steps of:
propagating a flush signal to each of the plurality of entries of the history buffer, wherein the flush signal comprises a flush instruction tag and each entry of the history buffer comprises logic configured to compare a flush instruction tag to one or more other instruction tags stored in the entry, wherein the flush instruction tag comprises an identifier of an instruction to flush;
responsive to the flush signal, generating, from an entry of the history buffer, the transactional memory state data, including:
for each of the plurality of entries, and in response to the flush signal, determining whether to generate the transactional memory state data in dependence upon an evictor tag and upon an instruction tag, wherein the evictor tag corresponds to an instruction tag of an instruction causing an update to the transaction memory state; and
restoring to a transaction memory state in dependence upon the transactional memory state data.

10. The apparatus of claim 9, wherein the transactional memory instruction is an instruction for updating the transactional memory state data.

11. The apparatus of claim 9, wherein the instruction tag corresponds to an instruction that most recently updated the transaction memory state.

12. The apparatus of claim 9, wherein the apparatus is further configured to carry out the steps of:
providing the transactional memory state data to a dispatch network for restoring the transactional memory state.

* * * * *